UNITED STATES PATENT OFFICE.

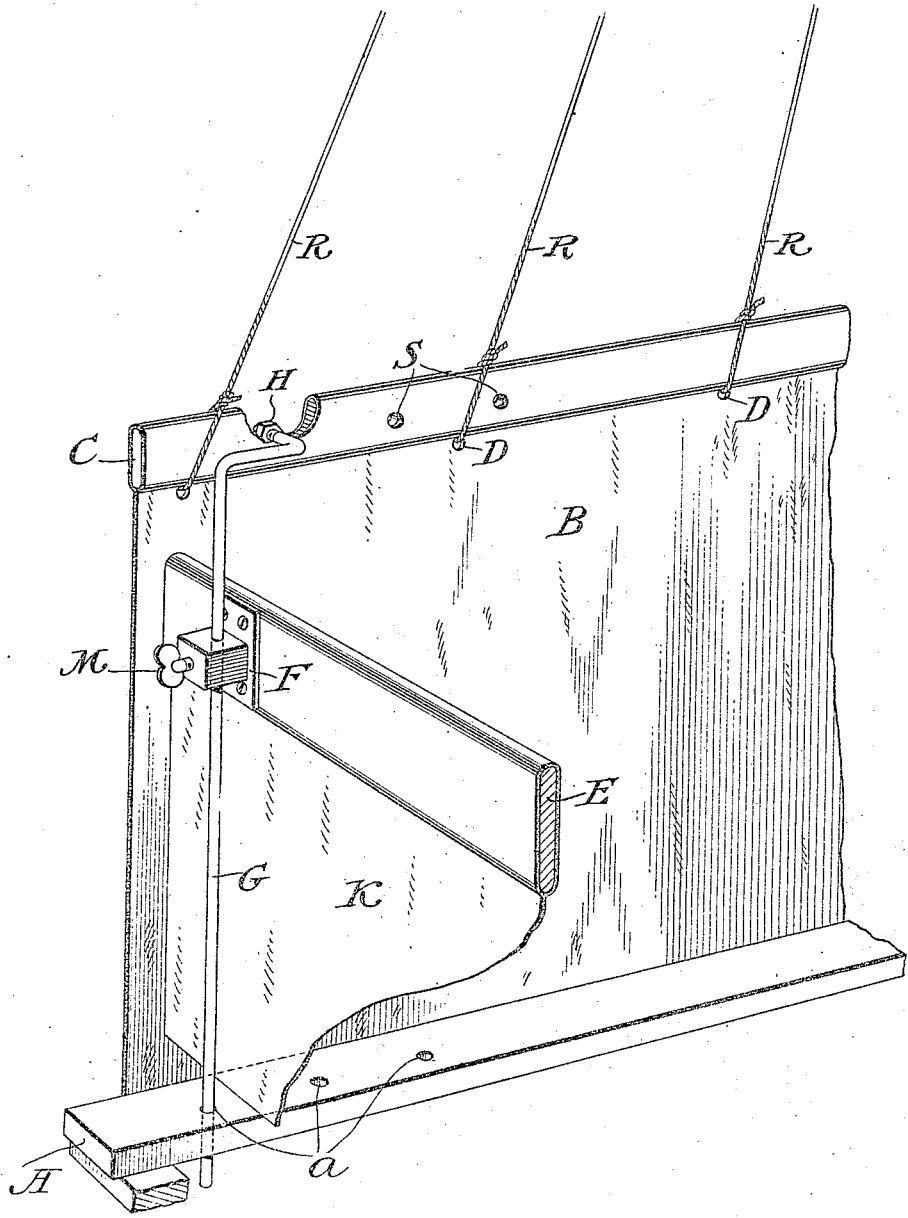

GEORGE F. SISBOWER, OF EAST ORANGE, NEW JERSEY, ASSIGNOR TO NEW YORK COUCH BED COMPANY, OF NEW YORK, N. Y., A CORPORATION OF NEW YORK.

COUCH-HAMMOCK.

1,016,102.      Specification of Letters Patent.      Patented Jan. 30, 1912.

Application filed October 9, 1911. Serial No. 653,712.

*To all whom it may concern:*

Be it known that I, GEORGE F. SISBOWER, a citizen of the United States, residing at East Orange, in the county of Essex and State of New Jersey, have invented certain new and useful Improvements in Couch-Hammocks, the following being a full, clear, and exact disclosure of the one form of my invention which I at present deem preferable.

For a detailed description of the present form of my invention, reference may be had to the following specification and to the accompanying drawing forming a part thereof and which shows a perspective view of my device.

My invention relates to a couch hammock and concerns chiefly a device for supporting and adjusting a back or wind-shield on such a hammock.

Referring to the drawing A represents one end bar of the bottom frame with which a couch-hammock is ordinarily provided. The construction of the frame and the mounting of the mattress thereon do not constitute a part of my present invention and the frame, so long as it is provided with an end-bar suitable for the arrangement to be hereinafter described, may be of any desired form and construction and any sort of mattress may be mounted thereon as may be necessary or desirable.

B represents a supporting strip of canvas applied to one end of the hammock, it being understood that a similar strip will be employed at the opposite end. The upper edge of strip B is provided with a spreader bar C, preferably inserted in a loop formed in the fabric, while suspension cords R R, etc., are passed through holes D D, etc., and wrapped around the bar C. The lower edge of strip B is secured to the end-bar A of the frame.

K represents a back for the hammock, assuming that the latter is used as a seat. The back is here shown as formed of a bar E with a curtain depending therefrom to serve as a wind-shield, but it may be of any desired form compatible with the mode of support and adjustment herein referred to.

G is a rod of metal which at its lower end is adapted to enter any desired one of a series of holes *a*, *a*, *a*, etc., in the end-bar A, and at its upper end is bent forward and then laterally and its tip inserted in any desired one of a series of holes *s*, *s*, etc., formed in the bar C. A nut H is applied to the end of the rod back of bar C to secure it in place. A metal block F is fastened to the rear of the back-bar E and the aforesaid rod G passes through a hole in the protruding part of the block and is secured thereto by a thumb-nut M. By this means the back K is supported in a simple and effective manner, while it may be adjusted in height by merely loosening thumb-nut M and sliding the block F up or down on rod G. When the back is at the proper height it may be secured in position by the thumb-nut. The back can also be adjusted forward or backward by removing nut H and then placing the upper end of rod G in any desired one of the holes *s* and its lower end in any desired one of the holes *a*. The two ends of rod G may be adjusted equally or not at will.

What I claim as new and desire to secure by Letters Patent is:

1. A couch hammock provided with a perforated spreader bar and a perforated end bar, a rod having its lower end entering a perforation in the end bar, the upper end of said rod being bent forwardly and laterally to enter a perforation in the spreader bar, and a back bar adjustably engaging said rod.

2. A couch-hammock having its spreader-bar and its end frame bar perforated, a rod bent at one end to enter a perforation in the spreader-bar, its other end entering a perforation in the end bar, a back bar slidably engaging said rod, and means for locking said back bar against movement relative to said rod.

3. A couch-hammock having its spreader-bar and end frame-bar perforated, a metal block on its back-bar and a rod entering perforations in the spreader-bar and end-bar respectively to which the hammock-back is adjustably secured.

In witness whereof I have hereunto set my hand, before two subscribing witnesses, this 3rd day of October, 1911.

GEORGE F. SISBOWER.

Witnesses:
    J. BLACKWOOD,
    L. T. S. ERISMAN.